(12) United States Patent
Bai et al.

(10) Patent No.: US 7,985,828 B2
(45) Date of Patent: Jul. 26, 2011

(54) SOLID POLYMER ELECTROLYTE, METHOD FOR MANUFACTURING THE SAME AND USE THEREOF

(75) Inventors: Shih-Jung Bai, Kaohsiung (TW); Ju-Pin Sun, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 697 days.

(21) Appl. No.: 11/983,134

(22) Filed: Nov. 7, 2007

(65) Prior Publication Data

US 2008/0300380 A1   Dec. 4, 2008

(30) Foreign Application Priority Data

May 14, 2007  (TW) ............... 96117079 A (51) Int. Cl.
  *C08G 69/42*   (2006.01)
  *C08F 283/04*   (2006.01)
(52) U.S. Cl. ........ 528/337; 528/336; 525/420; 429/492; 361/523
(58) Field of Classification Search .................. 525/420; 528/336, 337; 429/492; 361/523
  See application file for complete search history.

(56) References Cited

OTHER PUBLICATIONS

Chandrasekhar, V. "Polymer Solid Electroyltes: Synthesis and Sgtructure." *Advances in Polymer Science*, vol. 135 (1998) pp. 139-205.
Wolfe, J. F., et al. "Rigid-Rod Polymers. 1. Synthesis and Thermal Properties of Para-Aromatic Polymers with 2,6-Benzobisoxazole Units in the Main Chain." *Macromolecules* (1981) vol. 14, pp. 909-915.
Wolfe, J. F., et al. "Rigid-Rod Polymers. 2. Synthesis and Thermal Properties of Para-Aromatic Polymers with 2,6-Benzobisthiazole Units in the Main Chain." *Macromolecules* (1981) vol. 14, pp. 915-920.
Welsh, W. J., et al. "Phenylene Group Rotations and Nonplanar Conformations in Soc cis- and trans-Polu (benzobisoxazoles) and -Poly (benzobisthiazoles)." *Macromolecules* (1981) vol. 14, pp. 947-950.
Fitzgerald, J. J., et al. "Synthesis, Properties, and Structure of Sulfonate Ionomers." *J. Macromol. Sci.-Rev. Marcomol. Chem. Phys.* (1988) C28, pp. 99-185.
Dang, T. D., et al. "Ionic Conductivity of Conjugated Water-Soluble Rigid-Rod Polymers." *Journal of Polymer Science: Part B: Polymer Physics*, vol. 31 (1993) pp. 1941-1950.
Spry, R. J., et al. "Anisotropic Ionic Conductivity of Lithium-Doped Sulfonated PBI." *Journal of Polymer Science: Part B: Polymer Physics*, vol. 35 (1997) pp. 2925-2933.
Flory, P.J. "Phase Equilibria in Solutions of Rod-Like Particles." *Proceedings of the Royal Society of London. Series A, Mathematical and Physical Sciences*, (1956) vol. 234, No. 1196, pp. 73-89.
Berthier, C., et al. "Microscopic Investigation of Ionic Conductivity in Alkali Metal Salts-Poly(Ethylene Oxide)Adducts." *Solid State Ionics* (1983) vol. 11, pp. 91-95.
Bai, S. J., et al. "Solid electrolyte of fully conjugated, water-soluble rigid-rod polymer with articulated backbone for isotropic ionic conductivity." *Electrochemistry Communications 9* (2007) pp. 517-521.

*Primary Examiner* — Milton I Cano
*Assistant Examiner* — Gennadiy Mesh
(74) *Attorney, Agent, or Firm* — Ladas & Parry LLP (57) ABSTRACT

A solid electrolyte of fully conjugated, water-soluble rigid-rod polymer with articulated backbone for isotropic ionic conductivity, a method for synthesizing the solid electrolyte and a battery, fuel cell or super-capacitor including the solid electrolyte. The polymer has a repeating unit $E^1$ represented by the following general formula I:

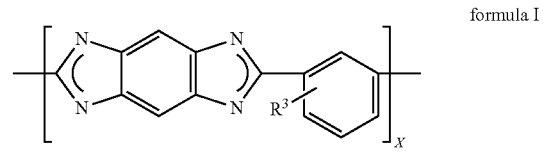

formula I wherein the repeating unit $E^1$ has two pendants, $L^1$ and $L^2$, linked to two of four N atoms of the repeating unit $E^1$; $L^1$ and $L^2$ independently represent a group of $R^1$—$SO_3M$, $R^1$ represents a hydrocarbon; M represents a cation selected from the group consisting of $Li^+$, $Na^+$, $H^+$ and $K^+$; $R^3$ represents a group of H or $SO_3M$; and x represents an integer larger than 100.

29 Claims, 5 Drawing Sheets

SOLID POLYMER ELECTROLYTE, METHOD FOR MANUFACTURING THE SAME AND USE THEREOF

This application claims the benefit under the provisions of 35 USC 119 of the following priority application: Taiwan 096117079, filed May 14, 2007.

BACKGROUND OF THE INVENTION

1. Field of the Invention

The present invention relates to a solid polymer electrolyte, particularly three-dimensionally isotropic solid polymer electrolyte of high ionic conductivity.

2. Description of the Related Art

The advantages of a solid electrolyte have long been recognized for rechargeable energy storage, i.e., battery and super-capacitor. Solid electrolytes are deemed to have superior energy density, cycle lifetime as well as volumetric, electrochemical and environmental stabilities unachievable by liquid or gel-type electrolytes. In addition, solid electrolyte permits significant improvements by allowing separator-free, unrestricted orientation and large surface-to-thickness device structure. Solid polymer electrolytes are conceived to have unique benefits in chemical variety, energy density, thermal stability, lightweight, flexible film, simple processing, low memory effect and long shelf life. Currently, solid polymer electrolytes for battery applications are limited by their low electrical conductivity. The room-temperature conductivity for the state-of-the art solid polyelectrolytes, such as $LiSO_3CF_3$ doped poly(ethylene oxide), is about $10^{-8}$ to $10^{-6}$ S/cm (V. Chandrasekhar, *Adv. Polym. Sci.* 1998, 135, 139) which is at least three orders of magnitude smaller than practical battery requirements.

A recently developed rigid-rod molecule of poly-p-phenylenebenzobisimidazole was a sulfonated heterocyclic aromatic polymer of poly[1,7-dihydrobenzo[1,2-d:4,5-d']diimidazo-2,6-diyl-(2-sulfo)-p-phenylene]], abbreviated as sPBI (J. F. Wolf and F. E. Arnold, *Marcromolecules* 1981, 14, 909; J. F. Wolf, B. H. Loo and F. E. Arnold, *Macromolecules* 1981, 14, 915). The chemical structure of sPBI is illustrated in the following formula IIa, formula IIa and y represents an integer larger than 10.

Because of its large molecular aspect ratio (length/width) from para-catenated backbone, this polymer assumes a nematic liquid-crystalline state having a fully conjugated backbone with configurations depending only on the rotation of bonds between alternating phenylene and heterocyclic groups (W. J. Welsh, D. Bhaumik and J. E. Mark, *Macromolecules* 1981, 14, 947). Consequently, this rod-like molecule displays superior mechanical tenacity, thermo-oxidative stability, and solvent resistance preventing thermal molding or extrusion to be applied to process sPBI. This intractable polymer is generally fabricated using an acidic solvent, most commonly methanesulfonic acid (MSA) or Lewis acids.

Chemical derivatization of sPBI with pendants of propanesulfonate ionomers for a sPBI-$X^+$ polyelectrolyte has been demonstrated successfully to promote solubility of sPBI (J. J. Fitzgerald and R. A. Weiss, *J. Macromol. Sci.-Rev. Marcomol. Chem. Phys.* 1988, C28, 99; M. Aldissi, U.S. Pat. No. 155, 450, 1989; T. D. Dang and F. E. Arnold, *Mater. Res. Soc. Sym. Proc.* 1993, 305, 49). As reported (T. D. Dang, S. J. Bai, D. P. Heberer, F. E. Arnold and R. J. Spry, *J. Polym. Sci., Part B Polym. Phys.* 1993, 31, 1941), sPBI-$X^+$ rigid-rod polyelectrolyte did show drastically enhanced water solubility and electrical conductivity. The conductivity was further identified to be ionic and not electronic, a critical factor for solid polyelectrolyte applications. However, it was also reported that cast films of sPBI-$X^+$ from a solution had structural anisotropy leading to anisotropic electric conductivity. The room-temperature direct-current (DC) conductivity parallel ($\sigma_\parallel$) and perpendicular ($\sigma_\perp$) to the film surface could be 8.3× $10^{-3}$ S/cm (T. D. Dang, S. J. Bai, D. P. Heberer, F. E. Arnold and R. J. Spry, *J. Polym. Sci., Part B Polym. Phys.* 1993, 31, 1941) and about $10^{-6}$ S/cm (R. J. Spry, M. D. Alexander, S. J. Bai, T. D. Dang, G. E. Price, D. R. Dean, B. Kumar, J. S. Solomon, and F. E. Arnold, *J. Polym. Sci., Part B: Polym. Phys.* 1997, 35, 2925), respectively. This anisotropic conductivity was attributed to the entropy effect in casting films of nematic liquid-crystalline rigid-rod polymers of sPBI and sPBI-$X^+$ (P. J. Flory, *Proc. R. Soc. London Ser. A* 1956, A234, 73). On the other hand, the room-temperature conductivity of battery, fuel cell or super-capacitor should be up to $10^{-4}$ S/cm. As a result, the room-temperature direct-current (DC) conductivity perpendicular ($\sigma_\perp$) to the film surface fails to meet the required conductivity for battery, fuel cell or super-capacitor.

SUMMARY OF THE INVENTION

An intractable and fully conjugated, aromatic, heterocyclic rigid-rod polymer sPBI, poly[1,7-dihydrobenzo[1,2-d:4,5-d']diimidazo-2,6-diyl-(2-sulfo)-p-phenylene], was derivatized for an articulated rigid-rod polymer asPBI. Preferably, asPBI is sulfonated in dimethylsulfoxide containing metal hydroxide for water-soluble polyelectrolytes asPBI-$M^+$. This backbone alternation significantly changed the intrinsic viscosity [η] of sPBI from 9.4 dL/g to 1.1 dL/g for asPBI containing minute (1/50 molar ratio) articulation moiety in one preferred embodiment indicating a more coil-like polyelectrolyte. The polyelectrolytes were co-dissolved in aqueous solution with a dopant and cast into films. Direct-current conductivity (σ) was measured at room-temperature parallel to the film surface yielding $\sigma_\parallel = 2.8 \times 10^{-3}$ S/cm for one preferred polymer electrolyte. X-ray scattering and electron microscopy indicated that the cast films of sPBI-$M^+$ was in-plane isotropic but out-of-the plane anisotropic, and of asPBI-$M^+$ was three-dimensionally isotropic. It suggested that cast films of asPBI-$M^+$ having articulated backbone acquired an isotropic microstructure as well as an isotropic σ superior to those of other solid polyelectrolytes.

One object of the present invention is to provide a polymer having a repeating unit $E^1$ represented by the following general formula I:

$$\left[\begin{array}{c}\chemfig{N=\bullet-N-R^3-\text{phenyl}}\end{array}\right]_x \quad \text{formula I}$$

wherein the repeating unit $E^1$ has two pendants, $L^1$ and $L^2$, linked to two of four N atoms of the repeating unit $E^1$;
$L^1$ and $L^2$ independently represent a group of $R^1$—$SO_3M$;
$R^1$ represents a hydrocarbon;
M represents a cation selected from the group consisting of $Li^+$, $Na^+$, $H^+$ and $K^+$;
$R^3$ represents a group of H or $SO_3M$; and
x represents an integer larger than 10.

Another object of the present invention is to provide a method for synthesizing the polymer as described above.

Still another object of the present invention is to provide a battery, fuel cell or super-capacitor comprising a solid electrolyte, wherein the solid electrolyte comprises the polymer as described above.

DETAILED DESCRIPTION OF THE INVENTION

According to the invention, the rigid-rod conventional polymers sPBI and sPBI-$X^+$ are modified by incorporating various fractions of meta phenylene (isophthalic acid) moiety into sPBI and sPBI-$X^+$ backbones making them into articulated rigid-rod polymers of asPBI and asPBI-$X^+$, respectively. The sulfonate ionomer derivatized asPBI and asPBI-$X^+$ are soluble in aprotic solvents as well as in water, and could be doped and cast into a thin film.

The present invention provides a polymer having a repeating unit $E^1$ represented by the following general formula I:

$$\text{formula I}$$

wherein the repeating unit $E^1$ has two pendants, $L^1$ and $L^2$, linked to two of four N atoms of the repeating unit $E^1$;
$L^1$ and $L^2$ independently represent a group of $R^1$—$SO_3M$;
$R^1$ represents a hydrocarbon;
M represents a cation selected from the group consisting of $Li^+$, $Na^+$, $H^+$ and $K^+$;
$R^3$ represents a group of H or $SO_3M$; and
x represents an integer larger than 10.

Preferably, the pendant $L^1$ is the same as $L^2$, and $L^1$ and $L^2$ are linked to two of the N atoms without a double bond, which can be at trans position or at cis position.

Preferably, $R^1$ comprises a hydrocarbon having one to twenty carbon atoms; more preferably, $R^1$ comprises a hydrocarbon having one to six carbon atoms. In another aspect, $R^1$ preferably comprises a flexible side chain with various conformation states for enhanced flexibility and solubility. The examples of the flexible side chain include, but are not limited to —$(CH_2)_n$—; wherein n is an integer. In another preferred embodiment of the invention, $R^1$ represents —$(CH_2)_3$—.

Preferably, M represents cation $Li^+$.

Preferably, x represents an integer larger than 100.

In one preferred embodiment of the invention, the repeating unit $E^1$ is represented by the following formula Ia;

$$\text{formula Ia}$$

Preferably, the polymer according to the invention further comprises a repeating unit $E^2$ represented by the following general formula II:

$$\text{formula II}$$

wherein the repeating unit $E^2$ has two pendants, $L^1$ and $L^2$, linked to two of four N atoms of the repeating unit $E^2$;
$L^1$ and $L^2$ independently represent a group of $R^4$—$SO_3M$;
$R^4$ represents a hydrocarbon;
M represents a cation selected from the group consisting of $Li^+$, $Na^+$, $H^+$ and $K^+$;
$R^2$ represents a group of H or $SO_3M$;
y represents an integer; and
x/y is from about 1/10 to about 1/100.

Preferably, the pendant $L^1$ is the same as $L^2$, and $L^1$ and $L^2$ are linked to two of the N atoms without a double bond, which can be at trans position or at cis position.

Preferably, $R^4$ comprises a hydrocarbon having one to twenty carbon atoms; more preferably, $R^4$ comprises a hydrocarbon having one to six carbon atoms. In another aspect, $R^4$ preferably comprises a flexible side chain with various conformation states for enhanced flexibility and solubility. The examples of the flexible side chain include, but are not limited to —$(CH_2)_n$—; wherein n is an integer. In another preferred embodiment of the invention, $R^4$ represents —$(CH_2)_3$—.

Preferably, M represents cation $Li^+$.

Preferably, x/y is from about 1/15 to about 1/50.

In one preferred embodiment of the invention, the repeating unit $E^2$ is represented by the following formula IIa, formula IIa

For casting as a film, the polymer according to the invention is preferably doped with $M^2I$, wherein $M^2$ represents a cation selected from the group consisting of $Li^+$, $Na^+$, $H^+$ and $K^+$. Preferably, the concentration of $M^2I$ is from about 0.1 wt % to about 10 wt %; more preferably, the concentration of $M^2I$ is from about 4 wt % to about 5 wt %.

The present invention also provides a method for synthesizing the polymer as described above. The synthesis of monomers, precursor rigid-rod and articulated rigid-rod polymers, as well as sulfonate rigid-rod polymers is conducted by polycondensation reactions.

According to the invention, the method for synthesizing the polymer having the repeating unit $E^1$ comprises steps of:

(a) reacting a compound of formula III formula III with $H_2SO_4$ to obtain a compound of formula IV formula IV (b) conducting a polycondensation reaction with a compound of formula IV and a compound of formula V formula V in the presence of Cat to obtain a polymer of formula VI formula VI wherein Cat is methanesulfonic acid or polyphosphoric acid; and

(c) sulfonating a polymer of formula VI with MH and a compound of formula VII formula VII to obtain the polymer of formula I.

The invention also provides a method for synthesizing the polymer comprising $E^1$ and $E^2$, which method comprises conducting a polycondensation reaction with x molar of a compound of formula III formula III y molar of a compound of formula VIII formula VIII a compound of formula IX formula IX $H_2N$ $NH_2$
$H_2N$ $NH_2$ and HCl in the presence of Cat to obtain the polymer comprising $E^1$ and $E^2$; wherein Cat is methanesulfonic acid or polyphosphoric acid;

wherein x and y independently represents an integer and x/y is from about 1/10 to about 1/100.

Preferably, x/y is from about 1/15 to about 1/50.

The present invention also provides a battery, fuel cell or super-capacitor comprising a solid electrolyte, wherein the solid electrolyte comprises the polymer as described above.

EXAMPLE

The following Examples are given for the purpose of illustration only and are not intended to limit the scope of the present invention.

Example 1

The synthesis of the rigid-rod polymer according to the invention was shown in scheme I.

A precursor rigid-rod polymer, sPBI, was synthesized in polyphosphoric acid (PPA) at 190° C. At a polymer concentration above 10 weight percent, the polymerization mixture showed anisotropic morphology indicative of the nematic liquid crystallinity commonly observed in the rigid-rod polymers. The precursor sPBI was soluble in PPA and MSA but not in water, tetrahydrofuran or methanol. The polymer was processed into isotropic films using MSA as the solvent.

The second rigid-rod polymer was a derivatization of the precursor asPBI polymer by treating the precursor with sodium hydride in anhydrous dimethylsulfoxide. Excess 2-propanesultone was then added to the reaction mixture, resulting in propane-sulfonate asPBI rigid-rod polymer with ionomeric pendants containing sodium cations, poly[(1,7-dipropylsulfo-sodium-benzo[1,2-d:4,5-d']diimidazole-2,6-diyl)-2-(2-sulfo)-m-phenylene]. For abbreviation, this propane-sulfonate asPBI rigid-rod polymer was referred to as asPBI-PS(Na$^+$). The asPBI-PS(Na$^+$) polymer had a light yellow color and was soluble in a variety of aprotic solvents, such as dimethylsulfoxide and dimethylacetamide.

Additionally, the asPBI-PS(Na$^+$) polymer was dialyzed to increase its molecular weight ($M_w$). The dialysis was conducted by placing 200 ml of a solution containing one weight percent of the polymer dissolved in water into a tubing of molecular membrane ($M_w$ cutoff 12,000-14,000). The membrane tubing was submerged in distilled water. Because of osmotic pressure difference between the solution and the distilled water, the lower $M_w$ polymer and the low $M_w$ contaminants would diffuse into the water bath which was replenished regularly. The higher $M_w$ asPBI-PS(Na$^+$) polymer in the membrane tubing was recovered and used for film fabrication. The polymer was processed into isotropic films using water as the solvent.

The third rigid-rod polymer was a derivatization of the sPBI-PS(Na$^+$) polymer. The asPBI-PS(Na$^+$) polymer was treated with concentrated hydrochloric acid resulting in poly [(1,7-dipropylsulfobenzo[1,2-d:4,5-d']diimidazole-2,6-diyl)-2-(2-sulfo)-m-phenylene], asPBI-PS(H$^+$). The sPBI-PS(H$^+$) polymer had a yellowish color and was soluble in PPA and MSA. Its solubility in water was markedly decreased to about 1 weight percent after substituting the Na+ cations of the pendants with H+ cations. Higher water solubility was not achievable mainly because of gel formation. The polymer was processed into isotropic films using MSA as the solvent.

Example 2

The synthesis of the rigid-rod polymer was shown in scheme II.

The precursor rigid-rod polymer, sPBI, was synthesized in polyphosphoric acid (PPA) at 170° C. At a polymer concentration above 10 weight percent, the polymerization mixture showed anisotropic morphology indicative of nematic liquid crystallinity commonly observed in rigid-rod polymers. sPBI was soluble in PPA and MSA but not in water, methanol, or tetrahydrofuran. The precursor sPBI was then derivatized with lithium hydride in anhydrous dimethylsulfoxide. Excess 2-propanesultone was added to the reaction mixture, resulting in propane-sulfonate rigid-rod polyelectrolyte with pendants containing lithium cations, sPBI-Li+.

The synthesis scheme for articulate rigid-rod asPBI-X+ was similar to that of sPBI-X+ with incorporation of isophthalic acid in the co-polycondensation reaction making the polyelectrolyte backbone into an articulated rigid-rod. Scheme II schematically depicts the chemical approaches leading to the synthesis of this articulated polyelectrolyte, asPBI-Li+, and the related molar fraction (x/y). Both sPBI-X+ and asPBI-X+ polyelectrolytes had a light yellow color and were soluble in a variety of aprotic solvents, such as dimethylsulfoxide and dimethylacetamide. The polyelectrolytes were cast into films using water as the solvent.

Example 3

The derivatized sPBI rigid-rod and asPBI articulated rigid-rod polyelectrolytes were soluble in water and tended to form isotropic solutions. An isotropic solution with two weight percent of sPBI-Li+ or asPBI-Li+ was placed in a casting dish and evacuated in a sublimator at 60° C. to remove the water solvent. For doped sPBI-Li+ or asPBI-Li+, a selected amount of lithium salt (in this case LiI) at concentrations up to 5 wt. % was co-dissolved with the polyelectrolytes for casting the doped film. The resultant film was extensively washed with methanol to remove residual solvent and then vacuum dried at 100° C. for 24 hours. The cast films were translucent with a light yellow color showing no birefringence.

Lithium could exist in the ionomeric pendants or as dopant cations. The lithium content of the cast films was determined via elemental analysis. The excess lithium content was computed and applied in analysis of electric conductivity. The film thickness and width were measured optically, and used to calculate the sample effective length for electric conductivity determination.

Figure 1:
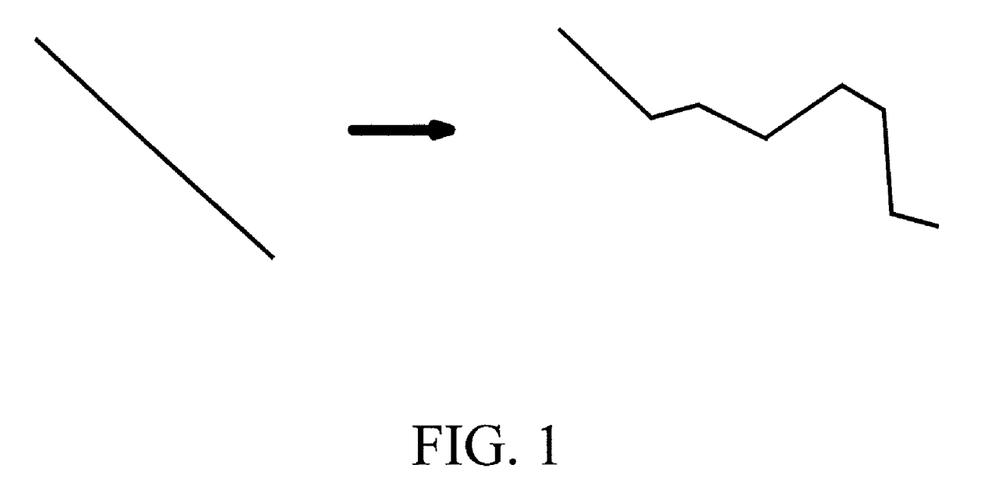
FIG. 1 illustrates a schematic of the backbone articulation of the polymer of the present invention.

The molecular backbone modification is introduced in FIG. 1. Both sPBI-Li+ and asPBI-Li+ were soluble in aprotic solvents as well as in water, and could be cast into thin films with or without lithium salt dopant for electric conductivity and film morphology determinations.

Intrinsic viscosity [η] was measured using a 1C Ubbelohde glass capillary viscometer to estimate molecular weight or size of sPBI and asPBI. For comparison with other results, the polymers were dissolved and measured in distilled MSA at 30° C. It was expected that sPBI was a rigid-rod polymer having huge hydrodynamic volume compared to that of the articulated rigid-rod asPBI. Repeated duration measurements of MSA solvent ($t_o$) and polymer solution (t) going through a fixed capillary length of the viscometer at a polymer concentration c yielded reduced viscosity $\eta_{red}=(t-t_o)/ct_o$ and inherent viscosity $\eta_{inh}=\ln(t/t_o)/c$.

Figure 2:
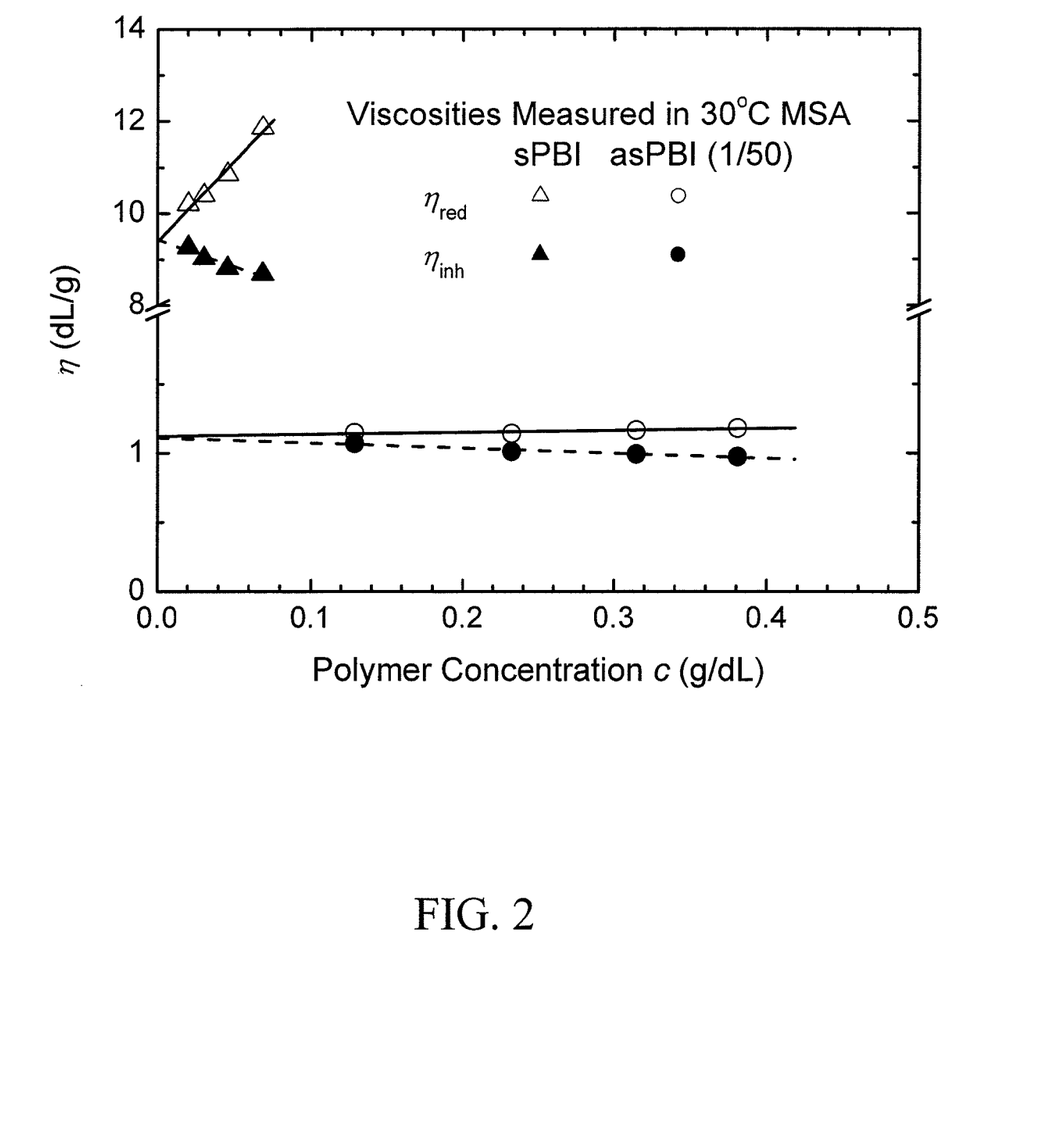
FIG. 2 illustrates viscosities of sPBI and asPBI (1/50) measured in 30° C. methanesulfonic acid.

The extrapolations of $\eta_{red}$ and $\eta_{inh}$ to c=0 give a common viscosity value called the intrinsic viscosity [η]. Using sPBI and asPBI of molar ratio (x/y)=(1/50) as examples to illustrate the sensitivity of viscosity measurements, the viscosity results are given in FIG. 2 which shows distinctly that the rigid-rod sPBI has a [η] of 9.40 dL/g and the asPBI containing minute articulation (1 in 50) along the rigid-rod backbone changes [η] to 1.11 dL/g. This significant intrinsic viscosity reduction also suggests that the articulated moiety, isophthalic acid, did not block together and was close to uniformly distributed on the backbone of asPBI. For asPBI of other (x/y)

molar ratios, the intrinsic viscosity [η] decreases according to the increase of articulated moiety for a more coil-like polymer.

Example 4

For decreasing contact resistance, room-temperature DC electric conductivity $\sigma_\parallel$ on a surface of the cast polyelectrolyte films was measured using the four-probe technique detailed elsewhere (T. D. Dang, S. J. Bai, D. P. Heberer, F. E. Arnold and R. J. Spry, *J. Polym. Sci., Part B Polym. Phys.* 1993, 31, 1941R; J. Spry, M. D. Alexander, S. J. Bai, T. D. Dang, G. E. Price, D. R. Dean, B. Kumar, J. S. Solomon, and F. E. Arnold, *J. Polym. Sci., Part B: Polym. Phys.* 1997, 35, 2925). For minimizing electric and light leakage, the film and four gold line electrodes were encased in a measurement module fabricated from virgin Teflon®. The contact between a polyelectrolyte film and the line electrodes was not maintained by an electrical adhesive or soldering compound, but by a slight pressure to account for the effective length accurately and to avoid contaminating the film. All conductivity measurements were programmed by a computer code to control a Keithley® 237 Source and Measurement Unit that would increase the value as well as reverse the polarity of the DC injection current from two external electrodes and would measure the respective voltage from two internal electrodes. Repetitive measurements at each DC current were made to verify the reproducibility of the results. The most consistent value independent of the injection current and polarity reversal was considered to be the room-temperature conductivity.

Figure 3:
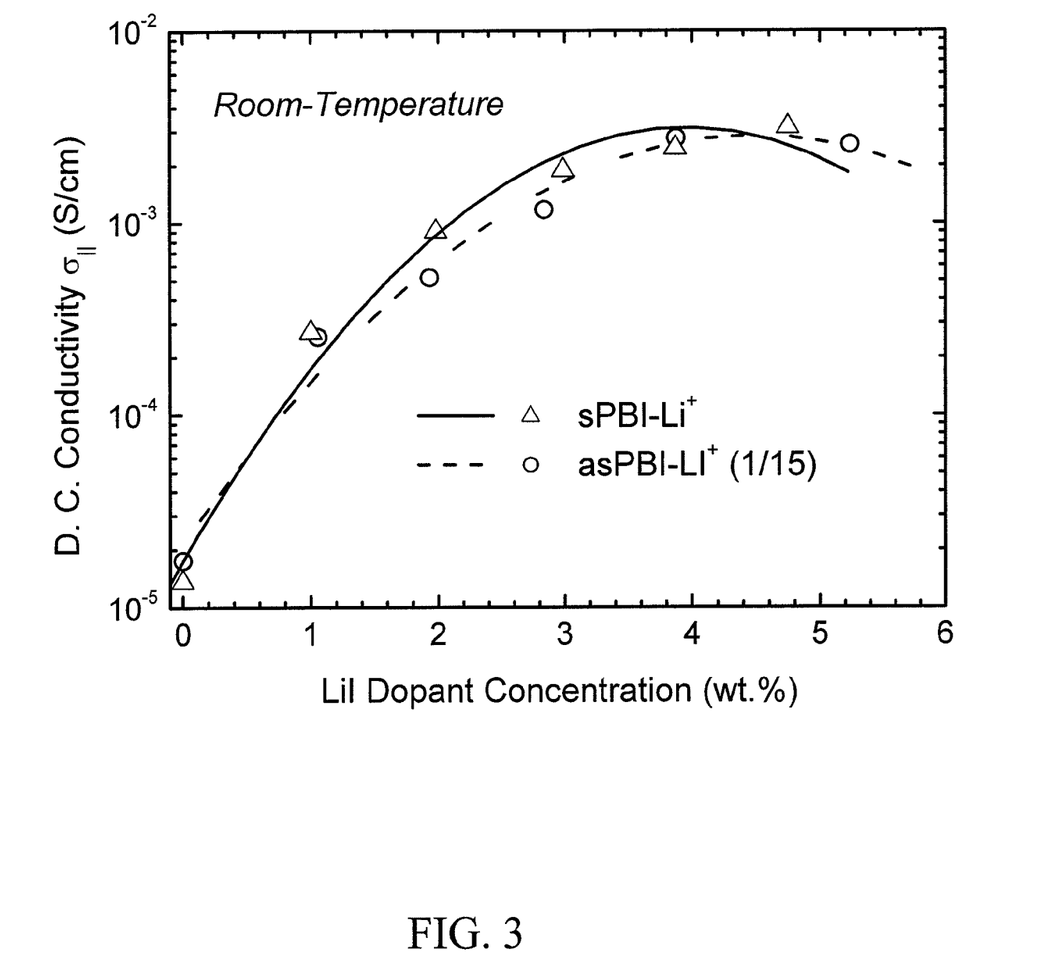
FIG. 3 illustrates room-temperature DC conductivity along the film surface ($\sigma_{\parallel}$) for LiI doped sPBI-$Li^+$ and asPBI-$Li^+$ (1/15) polyelectrolyte cast films.

The room-temperature DC electric conductivity ($\sigma$) measurement generated a typical ohmic response yielding a resistance which was converted to $\sigma_\parallel$ using the polyelectrolyte film thickness and width obtained from optical examination. This ohmic response is exemplified by FIG. 3 showing the DC $\sigma$ measurements of asPBI-Li$^+$ (1/15) containing various amount of LiI dopant. The conductivities of sPBI-Li$^+$ and asPBI-Li$^+$ (1/15) films doped with LiI with excess Li concentrations up to 5 wt. % are presented in FIG. 3 showing that the LiI dopant and a significant effect on the $\sigma_\parallel$ of the cast polyelectrolyte films. Without dopant, both have a room-temperature $\sigma_\parallel$ in the range of $1.3 \times 10^{-5}$ S/cm. Upon doping with LiI, the rigid-rod sPBI-Li$^+$ had a room-temperature $\sigma_\parallel$ increased to $3.15 \times 10^{-3}$ S/cm at an excess Li concentration about 4 wt. %. Likewise, the articulated rigid-rod asPBI-Li$^+$ (1/15) had a comparably smaller $\sigma_\parallel$ at each doping level, and peaked at 4.5 wt. % of excess Li concentration for a room-temperature $\sigma_\parallel$ value of $2.76 \times 10^{-3}$ S/cm. There is only less than 15 percent $\sigma_\parallel$ reduction for asPBI-Li$^+$ compared to that of sPBI-Li$^+$. It should also be noted that the conductivity has been identified to be ionic (T. D. Dang, S. J. Bai, D. P. Heberer, F. E. Arnold and R. J. Spry, *J. Polym. Sci., Part B Polym. Phys.* 1993, 31, 1941; J. Spry, M. D. Alexander, S. J. Bai, T. D. Dang, G. E. Price, D. R. Dean, B. Kumar, J. S. Solomon, and F. E. Arnold, *J. Polym. Sci., Part B. Polym. Phys.* 1997, 35, 2925).

Beyond the doping level yielding the highest conductivity, the $\sigma_\parallel$ would decrease mainly due to ionic cluster formation to decrease the effective number of charge carrier, and also a decrease of carrier mobility from an increase of cluster mass (T. D. Dang, S. J. Bai, D. P. Heberer, F. E. Arnold and R. J. Spry, *J. Polym. Sci., Part B Polym. Phys.* 1993, 31, 1941; C. Berthier, W. Gorecki, and B. Armand, *Solid State Ion.* 1983, 11, 91). Both were detrimental to $\sigma$. The effect of articulated rigid-rod of asPBI-Li$^+$ was examined and compared with that of rigid-rod sPBI-Li$^+$ via microstructure analyses of the cast films.

Example 5

Both X-ray scattering and electron microscopy were utilized to study structural anisotropy and molecular orientation pertinent to electrical conductivity of the polyelectrolyte films. For the scattering measurements, an X-ray camera with pinhole collimation was used. The X-ray source was a MAC Science® M12XHF rotating anode generator at 9 KW with a nickel foil as the monochromator to extract Cu Kα radiation with a wavelength of 0.154 nm. The polyelectrolyte film was attached onto the exit of the collimator with the X-ray aimed perpendicularly to the surface, or to the edge of the film for determining structural anisotropy. The X-ray area detector was a Fuji® Phosphor Imager system for superior dynamic range, response linearity and detection sensitivity. The sample-to-detector distance was set to cover a reciprocal space of $24 > Q > 1.8$ nm$^{-1}$, where scattering factor $Q = 4\pi \sin(\theta/2)/\lambda$, $\lambda$ being the X-ray wavelength and $\theta$ the scattering angle. This allowed coverage of a real space range (d) of $0.26 < d < 3.5$ nm, which is relevant to the unit cell structure, lattice orientation, and molecular packing orders. The digitized intensities were then processed for microstructure analyses of the polyelectrolyte films.

The cast film was also examined using a JEOL® JSM 6400 scanning electron microscope (SEM) for layered and anisotropic microstructure. Polyelectrolyte cast films were fractured at a cryogenic temperature and coated with Au for decreasing electron beam charging to improve imaging resolution. The SEM results were complementary to those of X-ray scattering for the microstructure and morphology of the cast films.

Both X-ray scattering and electron microscopy were utilized to study structural anisotropy and preferential molecular orientation pertinent to electrical conductivity of the fully conjugated polyelectrolyte films. Polyelectrolyte film scattering measurements were conducted with X-ray impinging frontally and sideways. The frontal X-ray scattering on sPBI-Li$^+$ and asPBI-Li$^+$ films all showed isotropic scattering pattern with a repeat distance of 1.2 nm along their backbones, side-by-side distance of 0.58 nm, and face-by-face distance of 0.36 nm agreeing with known sPBI repeat distance and lattice structure. However, the edgewise result showed distinct difference between sPBI-Li$^+$ and asPBI-Li$^+$. Using sPBI-Li$^+$ and asPBI-Li$^+$ (1/15) as examples, with the polyelectrolyte films mounted edgewise vertically, the sPBI-Li$^+$ and the asPBI-Li$^+$ cast films yielded an anisotropic and an isotropic scattering patterns, respectively. The scattering result can be reduced with line scan along equatorial and meridional directions as presented in FIG. 4.

Figure 4:
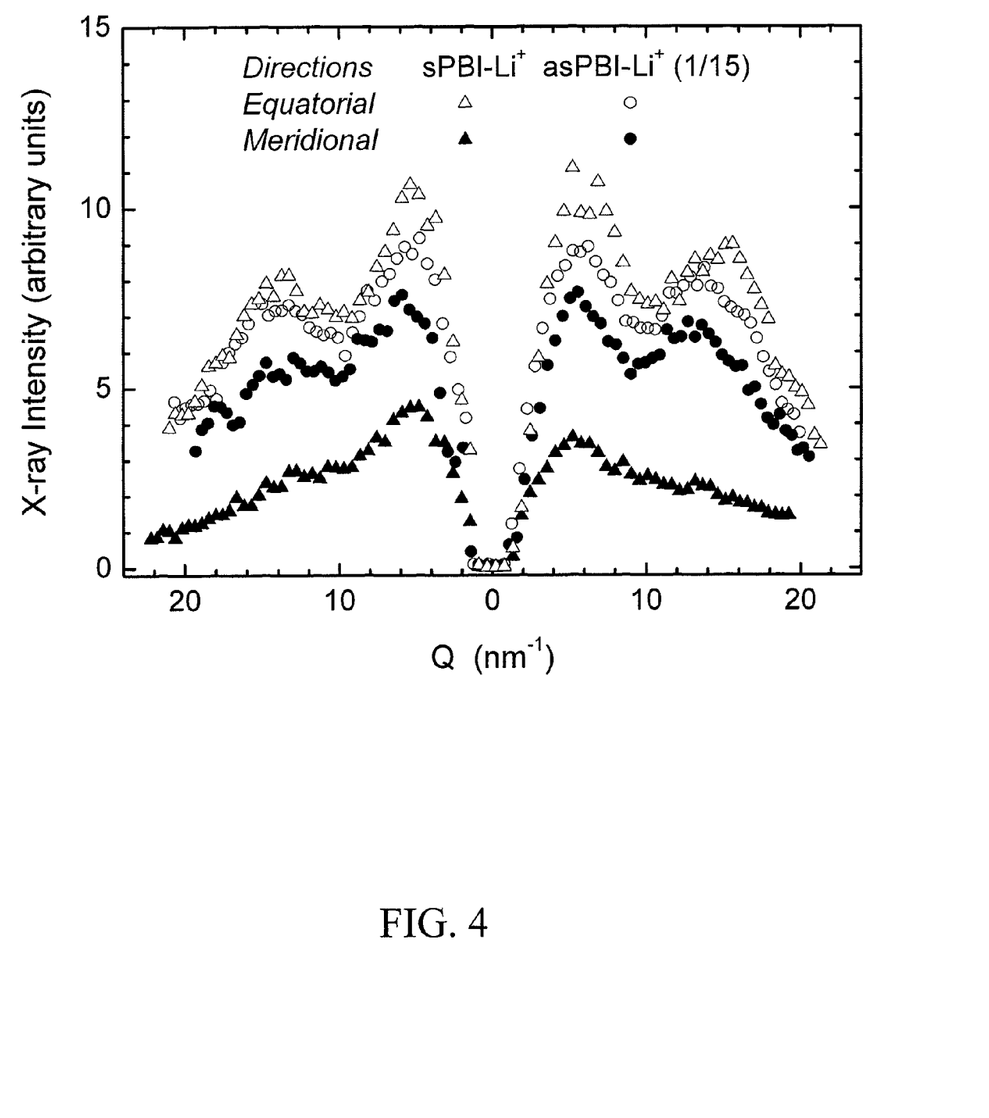
FIG. 4 illustrates equatorial and meridional line scans of X-ray scattering intensity of sPBI-$Li^+$ and asPBI-$Li^+$ (1/15) polyelectrolyte cast films. The films were mounted vertically and measured sideways.

As shown, the equatorial and the meridional scattering intensities of asPBI-Li$^+$ have about the same scattering intensity. The slightly smaller meridional intensity (●) is due mainly to more sample attenuation along the meridional (or the film surface) direction. However, X-ray scattering on sPBI-Li$^+$ shows anisotropic intensity with equatorial intensity (Δ) much higher than meridional intensity (▲). The coherent peak at scattering factor $Q = 0.54$ nm$^{-1}$ for all line scans is mainly due to the repeat distance of the sPBI backbone; the coherent peak at $Q = 14$ nm$^{-1}$ yields an averaged side-to-side and face-to-face intermolecular distances about 0.45 nm. This clearly demonstrated that the out-of the plane anisotropy of the sPBI-Li$^+$ cast film and three-dimensional isotropy of the asPBI-Li$^+$ cast film. The incorporation of an articulated moiety, isophthalic acid, did generate inherent kink on its molecular backbone, as illustrated in FIG. 1, to alleviate the entropy effect in creating in-plane and out-of-the plane structural anisotropy of the cast films.

Figure 5A:
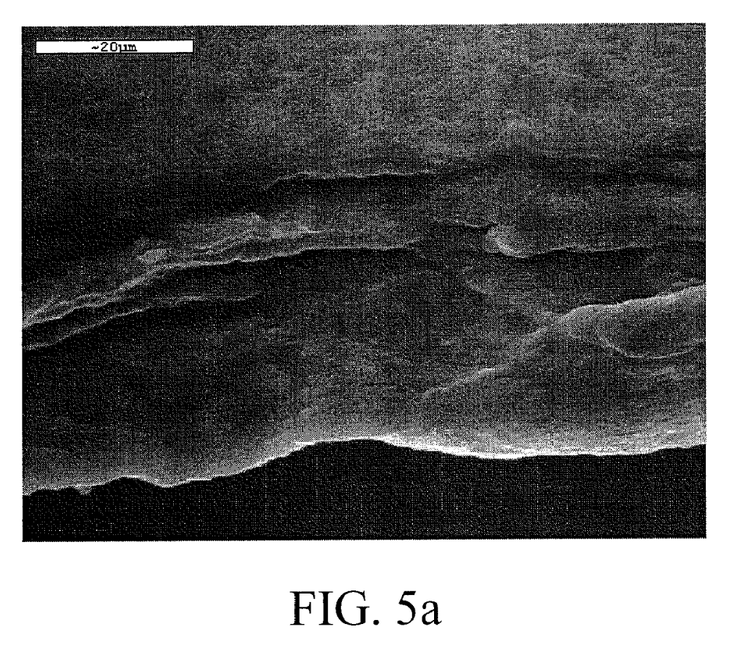
FIG. 5 illustrates scanning electron micrograms of cross sections of (a) sPBI-$Li^+$ and (b) asPBI-$Li^+$ (1/15) polyelectrolyte cast films.
Figure 5B:
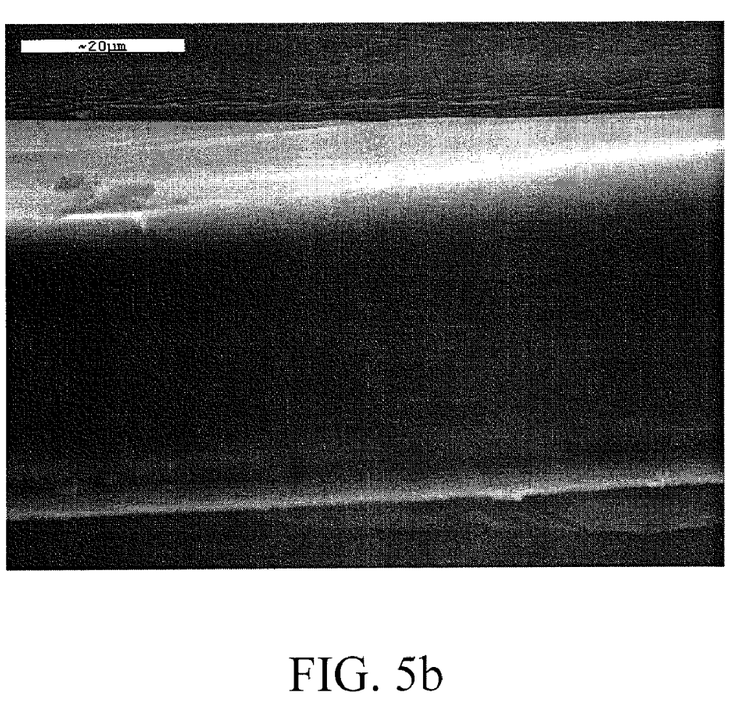

Similarly, fractured polyelectrolyte films coated with Au for decreasing electron beam charging to improve imaging resolution were examined by SEM. The electron micrographs of sPBI-Li$^+$ and asPBI-Li$^+$ are given in FIG. 5 showing that sPBI-Li$^+$ cast film had layered cross section and asPBI-Li$^+$ had homogeneous cross section agreeing with X-ray scattering results. Thus, molecular modification by adding isophthalic acid along the backbone of highly ionic conductive rigid-rod polyelectrolyte sPBI-Li$^+$ did create articulated rigid-rod polyelectrolyte asPBI-Li$^+$ with three-dimensionally isotropic microstructure and thus electrical conductivity for the cast films.

The incorporation of a meta-moiety of isophthalic acid at various degrees was successful in making the rigid-rod polyelectrolyte sPBI-Li$^+$ into an articulated rigid-rod polyelectrolyte asPBI-Li$^+$. Both were soluble in aprotic solvent and in water. With this backbone change, the molecular hydrodynamic volume reduces tremendously from sPBI to asPBI as reflected in intrinsic viscosity [η]. This polyelectrolyte backbone modification caused less than 15 percent reduction on surface DC electrical conductivity $\sigma_\parallel$ between sPBI-Li$^+$ and asPBI-Li$^+$ polyelectrolytes. Nevertheless, the room-temperature $\sigma_\parallel$ of their cast films was around $3\times10^{-3}$ S/cm, one of the rare solid polyelectrolytes with significantly high electric conductivity. X-ray scattering and scanning electron microscopy yielded consistent results indicating the cast films of sPBI-Li$^+$ had anisotropic layered microstructure and of asPBI-Li$^+$ had isotropic microstructure. It is thus believed that at room-temperature cast film of asPBI-Li$^+$ had three-dimensionally isotropic conductivity around $2.8\times10^{-3}$ S/cm.

While embodiments of the present invention have been illustrated and described, various modifications and improvements can be made by persons skilled in the art. The embodiments of the present invention are therefore described in an illustrative but not restrictive sense. It is intended that the present invention is not limited to the particular forms as illustrated, and that all the modifications not departing from the spirit and scope of the present invention are within the scope as defined in the appended claims.

What is claimed is:

1. A polymer having a repeating unit $E^1$ represented by the following general formula I:

formula I wherein the repeating unit $E^1$ has two pendants, $L^1$ and $L^2$, linked to two of four N atoms of the repeating unit $E^1$;
$L^1$ and $L^2$ independently represent a group of $R^1$—SO$_3$M,
$R^1$ represents a hydrocarbon;
M represents a cation selected from the group consisting of Li$^+$, Na$^+$, H$^+$ and K$^+$;
$R^3$ represents a group of H or SO$_3$M; and
x represents an integer larger than 100.

2. The polymer according to claim 1, wherein $L^1$ is the same as $L^2$.

3. The polymer according to claim 1, wherein $R^1$ comprises a hydrocarbon having one to twenty carbon atoms.

4. The polymer according to claim 3, wherein $R^1$ comprises a hydrocarbon having one to six carbon atoms 5. The polymer according to claim 1, wherein $R^1$ is —(CH$_2$)$_n$—; wherein n is an integer.

6. The polymer according to claim 5, wherein $R^1$ represents —(CH$_2$)$_3$—.

7. The polymer according to claim 1, wherein M represents cation Li$^+$.

8. The polymer according to claim 1, wherein the repeating unit $E^1$ is represented by the following formula Ia;

formula Ia

9. A polymer having a repeating unit $E^1$ represented by the following general formula I:

formula I wherein the repeating unit $E^1$ has two pendants, $L^1$ and $L^2$, linked to two of four N atoms of the repeating unit $E^1$;
$L^1$ and $L^2$ independently represent a group of $R^1$—SO$_3$M
$R^1$ represents a hydrocarbon;
M represents a cation selected from the group consisting of Li$^+$, Na$^+$, H$^+$ and K$^+$;
$R^3$ represents a group of H or SO$_3$M; and
x represents an integer larger than 10,
wherein the polymer further comprises a repeating unit $E^2$ represented by the following general formula II:

formula II wherein the repeating unit $E^2$ has two pendants, $L^1$ and $L^2$, linked to two of four N atoms of the repeating unit $E^2$;
$L^1$ and $L^2$ independently represent a group of $R^4$—SO$_3$M;
$R^4$ represents a hydrocarbon;
M represents a cation selected from the group consisting of Li$^+$, Na$^+$, H$^+$ and K$^+$;
$R^2$ represents a group of H or SO$_3$M;
y represents an integer; and
x/y is from about 1/10 to about 1/100.

10. The polymer according to claim 9, wherein x represents an integer larger than 100.

11. The polymer according to claim 9, wherein $L^1$ is the same as $L^2$.

12. The polymer according to claim 9, wherein $R^4$ comprises a hydrocarbon having one to twenty carbon atoms.

13. The polymer according to claim 12, wherein $R^4$ comprises a hydrocarbon having one to six carbon atoms.

14. The polymer according to claim 9 wherein $R^4$ is —$(CH_2)_n$—; wherein n is an integer.

15. The polymer according to claim 14, wherein $R^4$ represents —$(CH_2)_3$—.

16. The polymer according to claim 9, wherein M represents cation $Li^+$.

17. The polymer according to claim 9, wherein x/y is from about 1/15 to about 1/50.

18. The polymer according to claim 9, wherein the repeating unit $E^2$ is represented by the following formula IIa:

formula IIa

19. A polymer having a repeating unit $E^1$ represented by the following general formula I:

formula I wherein the repeating unit $E^1$ has two pendants, $L^1$ and $L^2$, linked to two of four N atoms of the repeating unit $E^1$;

$L^1$ and $L^2$ independently represent a group of $R^1$—$SO_3M$, $R^1$ represents a hydrocarbon;

M represents a cation selected from the group consisting of $Li^+$, $Na^+$, $H^+$ and $K^+$;

$R^3$ represents a group of H or $SO_3M$; and x represents an integer larger than 10, wherein the polymer is doped with $M^2I$, wherein $M^2$ represents a cation selected from the group consisting of $Li^+$, $Na^+$, $H^+$ and $K^+$.

20. The polymer according to claim 19, wherein the concentration of $M^2I$ is from about 0.1 wt%wt % to about 10 wt%wt %.

21. The polymer according to claim 20, wherein the concentration of $M^2I$ is from about 4 wt%wt % to about 5 wt% wt %.

22. A method for synthesizing the polymer according to claim 1 comprising steps of:

(a) reacting a compound of formula III formula III with $H_2SO_4$ to obtain a compound of formula IV formula IV (b) conducting a polycondensation reaction with a compound of formula IV and a compound of formula V formula V in the presence of Cat to obtain a polymer of formula VI formula VI wherein Cat is methanesulfonic acid or polyphosphoric acid; and

(c) sulfonating a polymer of formula VI with MH and a compound of formula VII formula VII to obtain the polymer of formula I.

23. A method for synthesizing the polymer of to claim 9 comprising conducting a polycondensation reaction with x molar of a compound of formula III y molar of a compound of formula VIII a compound of formula IX and HCl in the presence of Cat to obtain the polymer comprising $E^1$ and $E^2$;

wherein Cat is methanesulfonic acid or polyphosphoric acid;

wherein x and y independently represents an integer and x/y is from about 1/10 to about 1/100.

24. A battery comprising a solid electrolyte, wherein the solid electrolyte comprises the polymer according to claim 1.

25. A battery comprising a solid electrolyte, wherein the solid electrolyte comprises the polymer according to claim 9.

26. A fuel cell comprising a solid electrolyte, wherein the solid electrolyte comprises the polymer according to claim 1.

27. A fuel cell comprising a solid electrolyte, wherein the solid electrolyte comprises the polymer according to claim 9.

28. A super-capacitor comprising a solid electrolyte, wherein the solid electrolyte comprises the polymer according to claim 1.

29. A super-capacitor comprising a solid electrolyte, wherein the solid electrolyte comprises the polymer according to claim 9.

* * * * *